March 7, 1939.  H. GULDBRANDSEN  2,149,601
BINOCULAR VIEWING DEVICE FOR STEREOPHOTOGRAMMETRIC INSTRUMENTS
Filed Dec. 31, 1937

Inventor:
Henry Guldbrandsen

Patented Mar. 7, 1939

2,149,601

UNITED STATES PATENT OFFICE 2,149,601

BINOCULAR VIEWING DEVICE FOR STEREO-PHOTOGRAMMETRIC INSTRUMENTS

Henry Guldbrandsen, Jena, Germany, assignor to the firm Carl Zeiss, Jena, Germany Application December 31, 1937, Serial No. 182,886
In Germany January 18, 1937

2 Claims. (Cl. 88—29)

I have filed an application in Germany, January 18, 1937.

The invention concerns a binocular viewing device to be used in stereophotogrammetric measuring instruments and in each half of which a system of mirrors is so displaceable parallel to the base line that all mirrors participating in this displacement take part, in each of two different positions, in the imaging of one of the two elements of a stereoscopic image of an object, the observer being presented the view of an orthoscopic stereoscopic image in the one, and the view of a pseudoscopic stereoscopic image in the other of the said two positions.

To avoid in a viewing device of this kind the displacement of the mirror systems from the one position to the other entailing a change in the length of the ray pencils in the convergent path of the rays, the object side of the mirror system of each half of the device is provided according to the invention with a lens system which participates in the displacements of this mirror system and whose focal length is the same as the distance of its internal perspective centre from the image plane of the corresponding eye-piece, this distance being measured along the optical axis.

Figure 1:
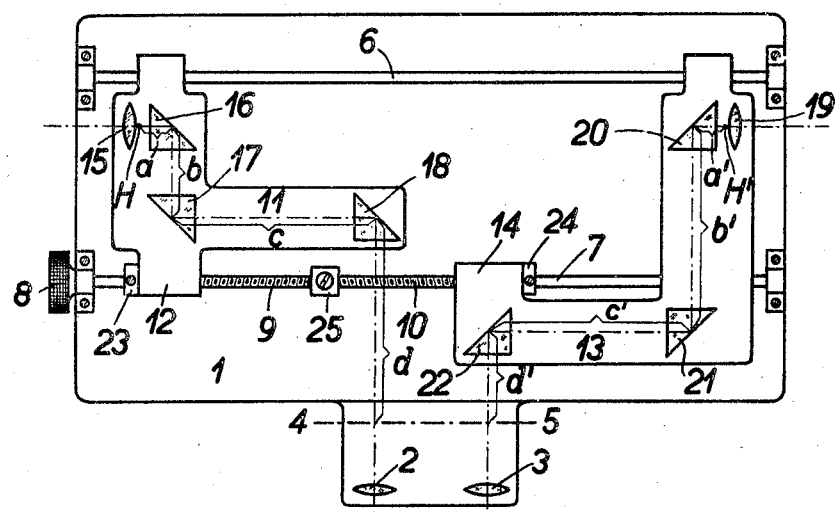
Figure 2:
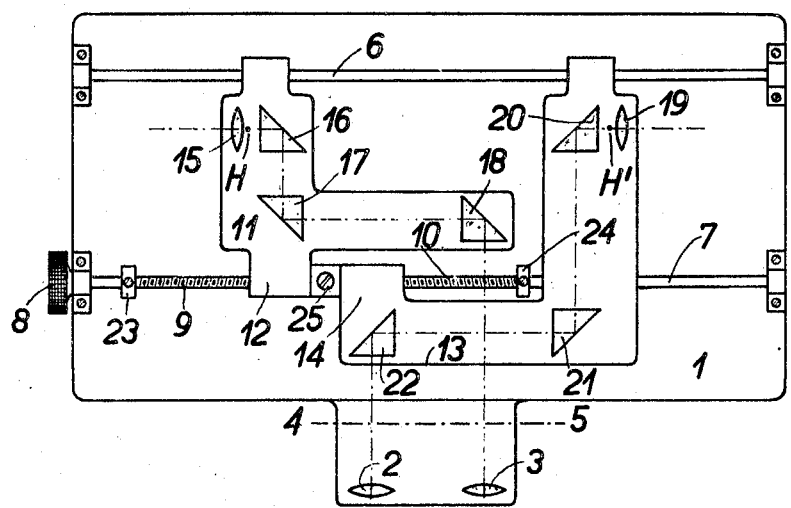

Figures 1 and 2 of the accompanying drawing, which illustrate the invention, represent part of a binocular viewing device for stereophotogrammetric plotting instruments in a section through the optical axis of this device, the displaceable system of optical members assuming two different positions. Figure 1 shows the position in which the observer is offered the view of an orthoscopic stereoscopic image, and Figure 2 the position in which the observer is offered the view of a pseudoscopic stereoscopic image.

To a base plate 1 are fixed the two eye-pieces 2 and 3 of the binocular viewing device, whose image planes 4 and 5 coincide. Two spindles 6 and 7 are so mounted on the base plate 1 that their axes are at right angles to those of the eye-pieces 2 and 3. The spindle 7 can be rotated about its axis by means of a milled head 8. This spindle 7 has a right-handed thread 9 and a spindle 7 has a right-handed thread 10. The internally threaded left-handed thread 10. The internally threaded part 12 of a plate 11 is in mesh with the right-handed thread 9, and the internally threaded part 14 of a plate 13 is in mesh with the left-handed thread 10. The plates 11 and 13 are displaceable along the spindle 6. The plate 11 carries a lens 15, whose axis is parallel to the axes of the spindles 6 and 7 and lies in the plane containing the axes of the eye-pieces 2 and 3, and three prisms 16, 17 and 18, each of which deflects the axis of the lens 15 within the said plane through 90°, so that this axis is parallel to the axes of the eye-pieces 2 and 3 when it emanates from the prism 18. The lens 15 has a focal length which is the same as the distance of its internal perspective centre H from the image planes 4 and 5 of the eye-pieces 2 and 3, this distance being measured along the optical axis. The focal length of the lens 15 corresponds, accordingly, to the sum of the distances designated $a$, $b$, $c$ and $d$ in Figure 1. The plate 13 carries a lens 19, whose axis coincides with that of the lens 15, and three prisms 20, 21 and 22, each of which deflects the axis of the lens 19 within the said plane through 90°, so that this axis is parallel to the axes of the eye-pieces 2 and 3 when it emanates from the prism 22. The lens 19 has a focal length which is the same as that of the lens 15. The distance of the internal perspective centre H' of the lens 19 from the image planes 4 and 5 of the eye-pieces 2 and 3, which is measured along the optical axis and composed of the distances $a'$, $b'$, $c'$ and $d'$, is accordingly, the same as the distance of the internal perspective centre H of the lens 15 from the said image planes 4 and 5, which is measured along the optical axis. To the spindle 7 are fixed stops 23, 24 and 25 for interrupting the displacements of the plates 11 and 13 in two directions. Figure 1 shows those extreme positions of the plates 11 and 13 in which the rays emanating from the lenses 15 and 19 are directed to the eye-pieces 2 and 3, respectively. In the other extreme positions of the plates 11 and 13, which are shown in Figure 2, the rays emanating from the lenses 15 and 19 are directed to the eye-pieces 3 and 2, respectively.

I claim:

1. In a device for viewing stereoscopic images, a base plate, two eye-pieces, two optical systems mounted on said base plate, the optical axes of said eye-pieces being parallel to each other, each said eye-pieces being parallel to each other, each said optical systems comprising a mirror system and a lens system, the focal plane of each of said optical systems coinciding with the image plane of said eye-pieces, each of said optical systems being displaceable relatively to said base plate along a line intersecting the said optical axes at right angles, and means for displacing each of said optical systems so as to make each optical system coact with either of said two eye-pieces.

2. In a device for viewing stereoscopic images, a base plate, two eye-pieces, two carriers mounted on said base plate, the optical axes of said eye-pieces being parallel to each other, two optical systems, each of said optical systems being fixed to one of said carriers, each of said optical systems comprising a mirror system and a lens system, the focal plane of each of said optical systems coinciding with the image plane of said eye-pieces, each of said carriers being displaceable relatively to said base plate along a line intersecting the said optical axes at right angles, means for displacing each of said carriers so as to make each optical system coact with either of said two eye-pieces, and means for so coupling said carriers that displacing the one carrier entails a corresponding reverse displacement of the other carrier.

HENRY GULDBRANDSEN.